United States Patent
Keller

[11] Patent Number: 5,573,281
[45] Date of Patent: Nov. 12, 1996

[54] ADAPTER

[76] Inventor: Wilhelm A. Keller, Obstgartenweg 9, CH-6402 Merlischachen, Switzerland

[21] Appl. No.: 550,396

[22] Filed: Oct. 30, 1995

Related U.S. Application Data

[63] Continuation-in-part of Ser. No. 216,328, Mar. 23, 1994, Pat. No. 5,462,317.

[51] Int. Cl.$^6$ .............................. F16L 25/00; B65D 5/72
[52] U.S. Cl. .................... 285/40; 285/177; 285/332.4; 285/333; 222/568; 222/566
[58] Field of Search .......................... 285/40, 251, 177, 285/176, 332.4, 333; 222/568, 567, 566, 520

[56] References Cited

U.S. PATENT DOCUMENTS

| | | |
|---|---|---|
| 1,222,088 | 4/1917 | Evans, Sr. . |
| 2,009,679 | 7/1935 | Placide . |
| 2,399,791 | 5/1946 | Conroy . |
| 3,032,358 | 5/1962 | Rolston . |
| 3,169,562 | 2/1965 | Gogel . |
| 3,680,896 | 8/1972 | Cupit . |
| 3,726,547 | 4/1973 | Cox, Jr. . |
| 4,079,966 | 3/1978 | Berry et al. ................................. 285/40 |
| 4,258,884 | 3/1981 | Rogers . |
| 4,266,813 | 5/1981 | Oliver . |
| 4,611,828 | 9/1986 | Brunet . |
| 4,688,833 | 8/1987 | Todd . |
| 4,957,225 | 9/1990 | Childers . |
| 4,995,540 | 2/1991 | Colin et al. . |
| 5,104,013 | 4/1992 | Hawley . |
| 5,248,071 | 9/1993 | Ray . |
| 5,249,716 | 10/1993 | O'Sullivan . |
| 5,275,447 | 1/1994 | McNab . |
| 5,346,380 | 2/1994 | Ables . |
| 5,462,317 | 10/1995 | Keller ....................................... 285/177 |

FOREIGN PATENT DOCUMENTS

| | | | |
|---|---|---|---|
| 472056 | 2/1992 | European Pat. Off. | ................. 285/40 |
| 2098692 | 11/1982 | United Kingdom . | |

*Primary Examiner*—Eric K. Nicholson
*Attorney, Agent, or Firm*—Marks & Murase L.L.P.

[57] ABSTRACT

The adapter for attachment onto an outlet of a dispensing means such as a mixing device, comprises a connecting part for attachment to the outlet and an outlet portion to which other parts can be connected or which can be a specially formed outlet itself. This connecting part comprises a cylindrical or an approximately frusto-conical internal surface part having a self-cutting thread for attachment onto an external surface of the outlet of a mixing device or other dispensing device. Such an adapter can be easily attached to the outlet of a standard static or dynamic mixer or other dispensing device having a stepped external surface, thus eliminating the necessity to keep an inventory of mixers with different outlets or outlet connections.

17 Claims, 4 Drawing Sheets

5,573,281

ADAPTER

CROSS-REFERENCE TO RELATED APPLICATION

This application is a continuation-in-part application of U.S. patent application Ser. No. 08/216,328, filed Mar.23, 1994 now U.S. Pat. No. 5,462,317.

BACKGROUND OF THE INVENTION

1. Field of the Invention

The present invention pertains to an adapter for a dispensing apparatus, more particularly to an adapter of the LUER lock type.

Adapters of the LUER lock type are known, particularly for adapting a hollow needle or other tip to the nozzle of a dispensing apparatus or a subsequent mixing device. Such conventional needles, tips, or other devices, however, have a specific connecting part, which necessitates a corresponding specifically-formed endpiece on the nozzle. This requirement for exactly corresponding pieces severely limits the interchangeability and utility of such needles or tips when used in connection with static mixers or other dispensing nozzles. This requirement also results in the need for multiple mixing devices or other dispensing devices equipped with a variety of outlet ends.

SUMMARY OF THE INVENTION

Accordingly, an object of the present invention is to provide a novel adapter which can be fastened on a wide variety of different mixer outlets and other dispensing devices without the necessity of exactly corresponding connecting parts.

This purpose is achieved with an adapter to be adapted onto an outlet of a mixing device or other dispensing device, comprising a connecting part for attachment to the outlet and an outlet portion, wherein the outlet has an external stepped surface, wherein the connecting part has an internal surface which is stepped, wherein the stepped internal surface comprises at least two approximately frusto-conical internal surface parts, each approximately frusto-conical internal surface part having a self-cutting thread for attachment onto the external surface of the outlet of the device, and wherein the stepped internal surface acts as a guide for cooperating with the external stepped surface of the outlet.

BRIEF DESCRIPTION OF THE DRAWINGS

A more complete appreciation of the present invention and many of the attendant advantages thereof will be readily obtained as the same become better understood by reference to the following detailed description when considered in connection with the accompanying drawings, wherein.

DETAILED DESCRIPTION OF THE INVENTION

Figure 1:
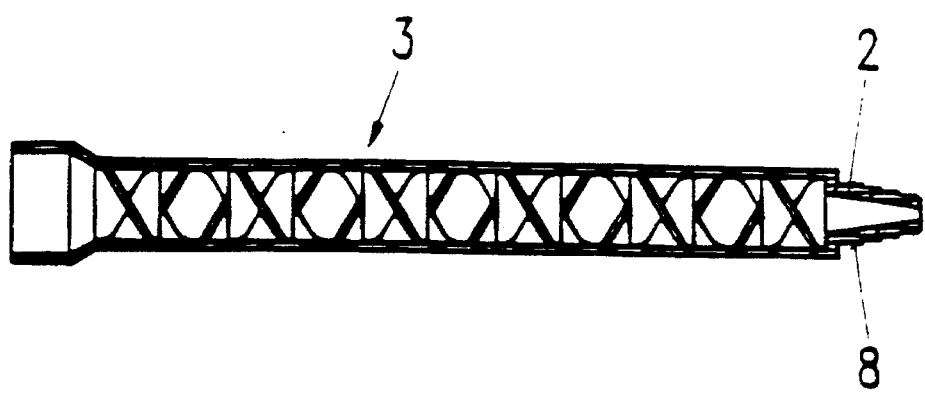
FIG. 1 portrays a static mixer in a sectional view.

Referring now to the drawings, wherein like reference numerals designate identical or corresponding parts throughout the several views, and more particularly to FIG. 1 which shows a conventional static mixer 3 having an outlet end 2 with a stepped external surface 8, comprising several steps, for example, as illustrated in FIG. 1 with four steps.

Figure 2A:
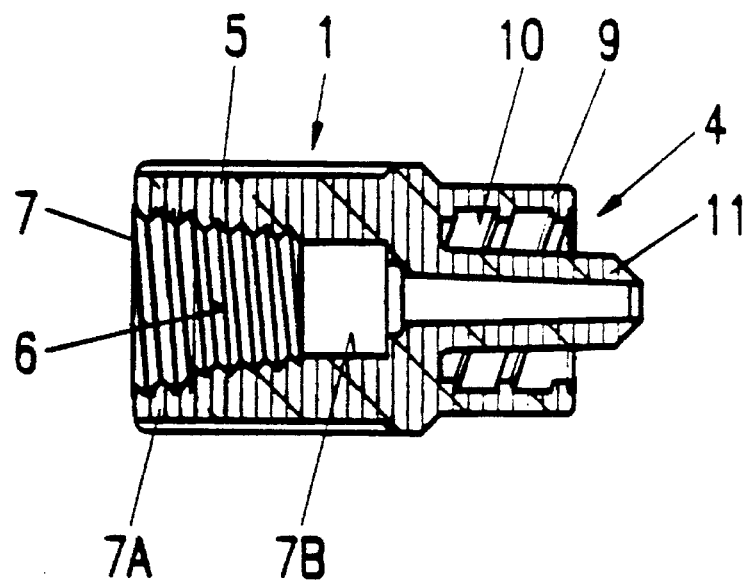
FIG. 2A illustrates a first embodiment of an adapter according to the present invention in a sectional view.

FIG. 2A portrays a first embodiment of an adapter 1. Whilst the outlet portion 4 of this first embodiment is similar to a LUER lock type socket, the inner surface 7 of its connecting part 5 differs from known adapters in that its internal surface is stepped, provided with two frusto-conical parts having self-cutting threads 6 and 7A, and is shaped to correspond to the stepped external surface 8 of the mixing device. Part 7B of inner surface 7 is stepped, but does not have self-cutting threads. This configuration allows a precise guiding of the adapter onto the corresponding stepped sections of the external surface 8 of the mixing device. Preferably, the adapter according to the present invention is injection molded and made of a harder plastics material than the material of the outlet onto which the adapter is to be fitted.

The outlet portion 4 of this embodiment of an adapter can be adapted to form a LUER lock adapter, comprising an outlet piece 9 with an internal thread 10 and a slightly conical central tip 11. In this configuration of the outlet portion the outlet portion 4 can receive a hollow needle, canula, or any other objects conventionally attached to a LUER lock adapter. In an alternate embodiment of the present invention, in place of the Luer lock connection illustrated in FIG. 2A, a thread or a bayonet type connection can be employed, the outlet portion 4 then adapted to serve as the socket portion of this type of connection.

Figure 2B:
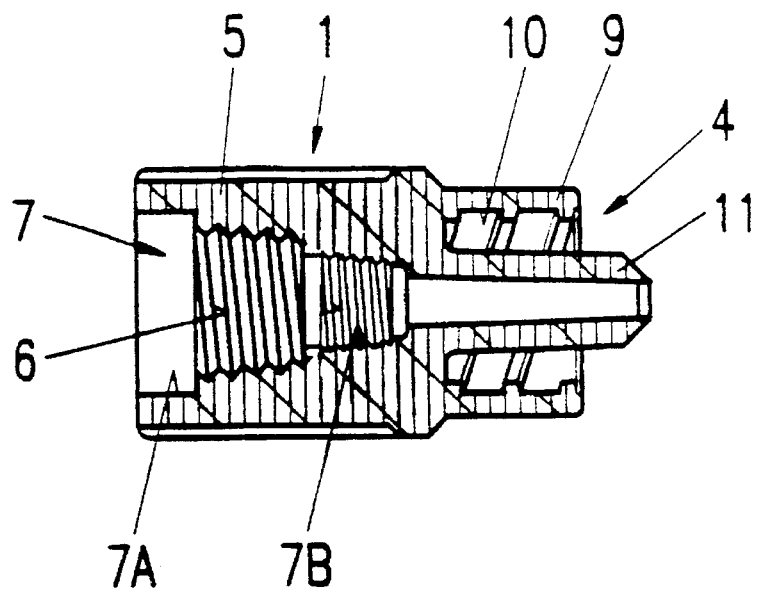
FIG. 2B illustrates a second embodiment of an adapter according to the present invention in a sectional view.

FIG. 2B illustrates another embodiment of the present invention, in which, as in FIG. 2A, the inner surface 7 of its connecting part 5 is stepped, provided with two frusto-conical parts having self-cutting threads 6 and 7B, and is shaped to correspond to the stepped external surface 8 of the mixing device. However, the arrangement of the two frusto-conical parts in FIG. 2B differs from that of FIG. 2A. Part 7A of inner surface 7 is stepped, but does not have self-cutting threads. As before, this configuration allows a precise guiding of the adapter onto the corresponding stepped sections of the external surface 8 of the mixing device.

Figure 3:
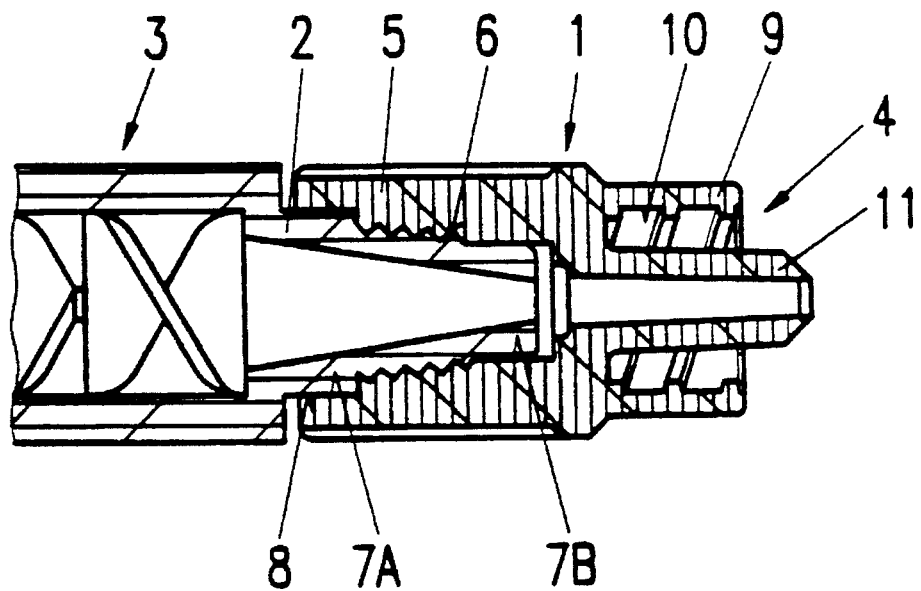
FIG. 3 displays the adapter of FIG. 2A on the outlet of the static mixer of FIG. 1 in a sectional view.

FIG. 3 depicts the adapter 1 of FIG. 2 fastened to the static mixer 3 of FIG. 1 wherein the self-cutting threads 6 engage the corresponding threads in the external stepped surface 8 of the static mixer 1. In another embodiment of the present invention, the self-cutting threads cut corresponding threads in the external stepped surface of the static mixer.

Figure 4:
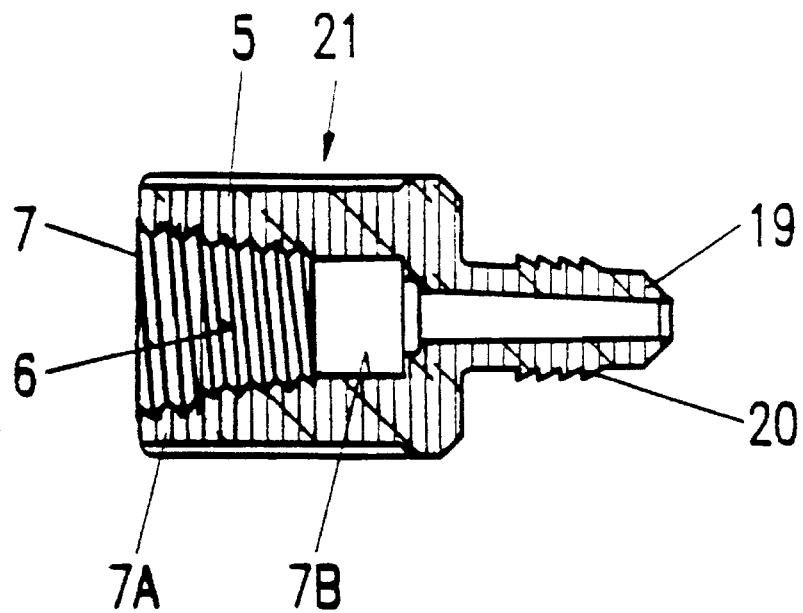
FIG. 4 portrays a third embodiment of an adapter according to the present invention in a sectional view.

FIG. 4 shows a second embodiment of the present invention wherein the outlet tip 19 is provided with retaining ribs 20 for the attachment of a hose or the like conducting means. The other parts of the adapter 21 are the same as in FIG. 2A.

Figure 5A:
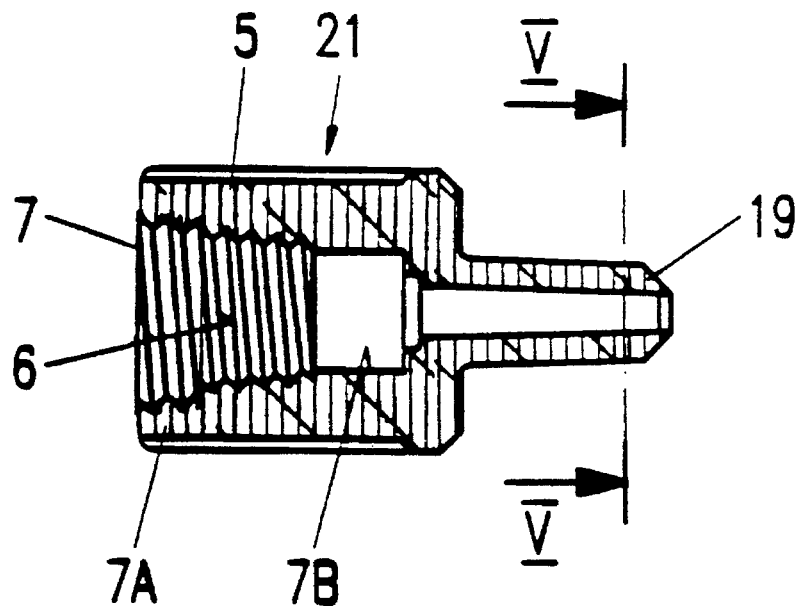
FIG. 5A illustrates a variant of the adapter of FIG. 4 in a sectional view.

FIG. 5A shows a variant of the embodiment of FIG. 4, wherein the outlet tip 19 is not provided with retaining ribs, but the tip, nevertheless, is also adapted for the attachment of a hose or similar conducting means. The other parts of the adapter 21 are the same as in FIG. 2A.

Figure 5B:
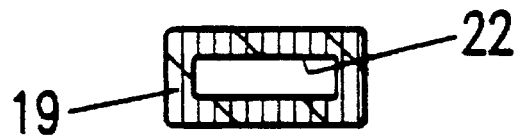
FIG. 5B displays a cross-section along line V—V in FIG. 5A.

FIG. 5B is a cross-section of tip 19 of FIG. 5A and illustrates that the cross-section of the opening 22 of outlet tip 19 of the adapter, or of a tip fixed thereon, need not to be circular and can be either rectangular as shown or have any other cross-section, for example, triangular, square, oval or other geometrical shape.

Figure 6:
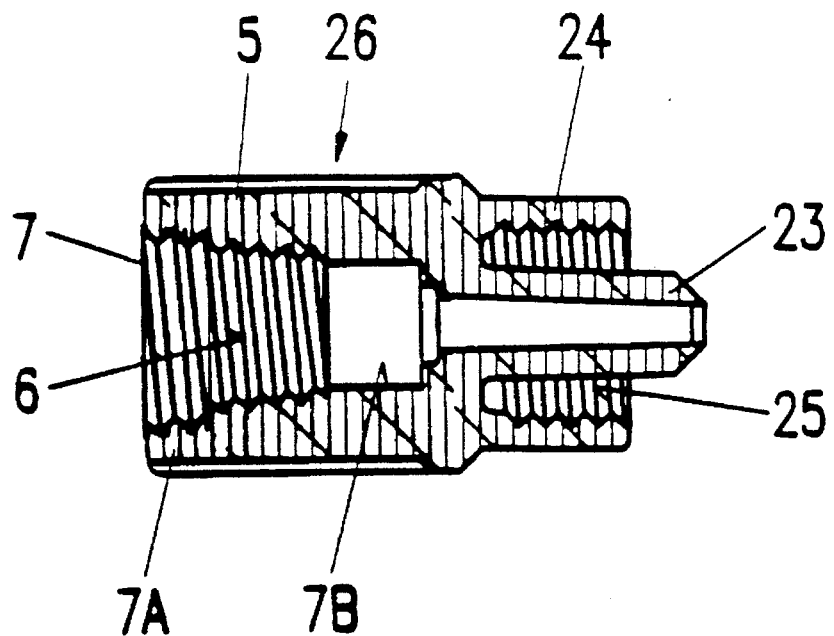
FIG. 6 portrays a variant of the adapter of FIG. 2A.

FIG. 6 shows still another embodiment of the present invention, differing from FIG. 4 in that the central outlet tip 23 is not provided with retaining ribs. For the attachment of a hose or analogous conducting means, the internal surface of outlet piece 24 is provided with an internal thread 25. In other embodiments of the present invention, this arrangement can be altered to be a socket for a bayonet type connection. The other parts of the adapter 26 are the same as in FIG. 2A.

Figure 7:
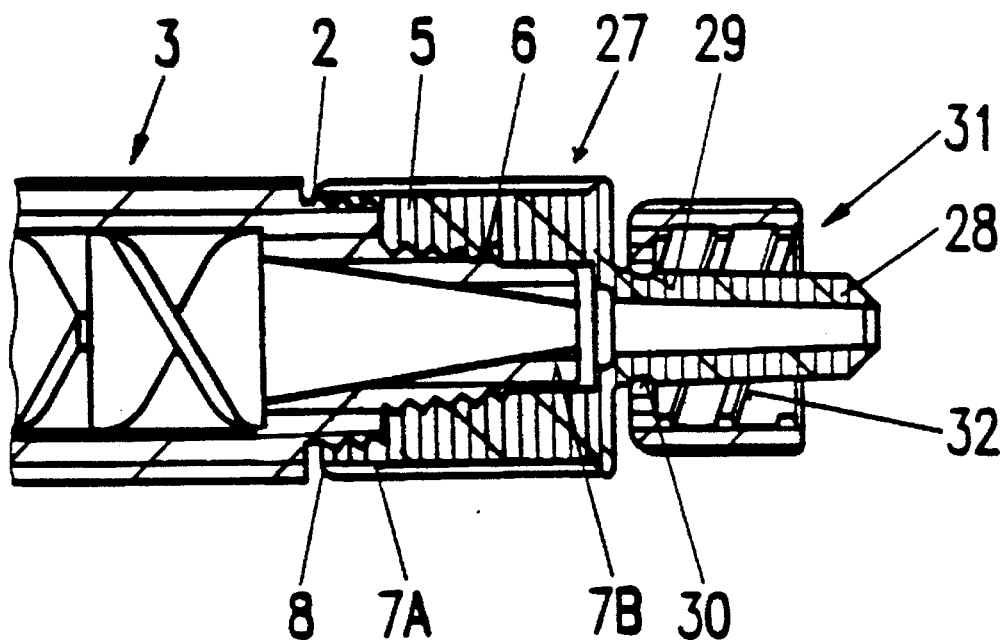
FIG. 7 illustrates a fourth embodiment of an adapter according to the present invention on the outlet of the static mixer of FIG. 1 in a sectional view.

FIG. 7 shows another embodiment of the adapter according to the present invention, also fastened to the outlet of a mixing device 3. The connecting part 5 of adapter 27 is similar to the previously shown adapters, but differs in that its outlet portion comprises a central tip 28 having near the connecting part a circular groove 29 for receiving the end 30 of a snap-on retaining ring 31 having an internal thread 32. This outlet portion could also be replaced by a socket for a bayonet type connection. The snap-on retaining ring permits the fastening of a hollow needle or other outlet device as described above.

Alternatively, in place of the snap-on ring, other connections may be received by the circular groove, in particular, these other connections include the different tips disclosed in European Patent Application No. 579,889, which is incorporated herein by reference. In this embodiment, the outlet portion can also be provided with a socket for a bayonet type connection, instead of an internal thread.

It is understood that the connecting part of the adapter need not have the exact shape illustrated in the Figures. Thus, the internal self-cutting thread which is generally provided on a frusto-conical internal surface part can also be applied to a cylindrical internal surface part. Moreover, an adapter which is particularly suited for a standardized stepped external surface of a static mixer with cylindrical steps, can also be fastened on a generally slightly conical surface having less pronounced steps or only one step. Also there need not be a guiding surface 7, which may be omitted. The guiding surfaces are, if adapted to the stepped external surface of the mixer outlet also cylindrical, but, in an alternate variant, the guiding surfaces may be slightly conical.

It follows from the above description of the many embodiments of the present invention that the adapter of the present invention can be easily attached to a great variety of outlets of dispensing apparatus and, in particular, to the outlet end of static or dynamic mixers. This arrangement, in which the outlet portion of the adapter can be employed independently, in large part, from its connecting part, permits a greater variety of different kinds of outlet attachments or cross-sections, without necessitating a large inventory of a wide variety of static mixers or other dispensing devices with different end configurations.

Obviously, numerous modifications and variations of the present invention are possible in light of the above teachings. It is therefore to be understood that within the scope of the appended claims, the present invention may be practiced otherwise than as specifically described herein.

What is claimed is:

1. An adapter for attachment to an outlet of a device selected from the group consisting of a mixing device and a dispensing device, comprising a connecting part for attachment to said outlet and an outlet portion, wherein said outlet has an external stepped surface, wherein said connecting part has an internal surface which is stepped, wherein said stepped internal surface comprises at least two approximately frusto-conical internal surface parts, each approximately frusto-conical internal surface part having a self-cutting thread for attachment onto the external surface of said outlet of said device, and wherein the stepped internal surface acts as a guide for cooperating with the external stepped surface of said outlet.

2. The adapter according to claim 1, wherein said adapter is injection molded of a harder plastics material than said outlet of said device.

3. The adapter according to claim 1, wherein the outlet portion of the adapter is a socket part of a LUER lock adapter.

4. The adapter according to claim 1, wherein the connecting part of the adapter is provided with a frustoconical internal surface part having a self-cutting thread and two adjacent guiding parts and wherein the outlet portion of the adapter is a socket part of a LUER lock adapter.

5. The adapter according to claim 1, wherein said outlet portion comprises an outlet tip having retaining ribs for the attachment of a hose.

6. The adapter of claim 5, wherein said outlet portion is designed for attachment of a conducting means, said outlet portion comprising a central outlet tip and concentrical thereto an outlet piece.

7. The adapter of claim 6, wherein said conducting means is a hose.

8. The adapter of claim 6, wherein said outlet piece has an internal thread.

9. The adapter of claim 6, wherein said outlet piece formed as a socket for a bayonet type connection.

10. The adapter according to claim 1, wherein said outlet portion comprises a central tip formed as an outlet having a circular groove for receiving a snap-on attachment means.

11. The adapter according to claim 1, wherein said outlet portion comprises a central tip formed as an outlet having a circular groove on which a snap-on retaining ring is removably fastened, said ring having an outlet end.

12. The adapter according to claim 11, wherein said outlet end has an internal thread.

13. The adapter according to Claim 11, wherein said outlet end is formed as a socket for a bayonet type connection.

14. The adapter according to claim 1, wherein said outlet portion has an opening having a cross-section which is a shape selected from the group consisting of cylindrical, rectangular, square, triangular and oval.

15. The adapter according to claim 1, wherein said outlet portion receives a further outlet means.

16. The adapter according to claim 15, wherein said further outlet means has an opening having a cross-section which is a shape selected from the group consisting of cylindrical, rectangular, square, triangular and oval.

17. The adapter according to claim 1, wherein said outlet portion is formed as an outlet.

\* \* \* \* \*

UNITED STATES PATENT AND TRADEMARK OFFICE
CERTIFICATE OF CORRECTION

PATENT NO. : 5,573,281
DATED : November 12, 1996
INVENTOR(S) : KELLER, Wilhelm A.

It is certified that error appears in the above-indentified patent and that said Letters Patent is hereby corrected as shown below:

On the title page:

In item [56] the following references should be listed:

U.S. PATENT DOCUMENTS
4,979,942    12/90    Wolf et al.    604/83.

FOREIGN PATENT DOCUMENTS
1,486,663    8/65    Germany.

Signed and Sealed this

Twentieth Day of May, 1997

Attest:

BRUCE LEHMAN

*Attesting Officer*      *Commissioner of Patents and Trademarks*